United States Patent
Lampe et al.

(10) Patent No.: US 6,194,794 B1
(45) Date of Patent: Feb. 27, 2001

(54) INTEGRATED RECIPROCATING ENGINE GENERATOR SET AND TURBOGENERATOR SYSTEM AND METHOD

(75) Inventors: Steven W. Lampe, Westlake Village; Edward C. Edelman, Agoura Hills; Joel B. Wacknov, Thousand Oaks, all of CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/359,815

(22) Filed: Jul. 23, 1999

(51) Int. Cl.[7] .................................................. H02J 9/08
(52) U.S. Cl. ................................................... 307/68
(58) Field of Search .................... 307/68, 64, 65, 307/80, 81, 87

(56) References Cited

U.S. PATENT DOCUMENTS

| | | |
|---|---|---|
| 3,050,635 | 8/1962 | Tanner . |
| 3,191,050 | 6/1965 | Park . |
| 3,221,172 | 11/1965 | Rolison . |
| 3,283,165 | 11/1966 | Bloch . |
| 3,368,082 | 2/1968 | Oberlander . |
| 4,186,312 | 1/1980 | Dvorak . |
| 4,460,834 | 7/1984 | Gottfried . |
| 4,731,547 | 3/1988 | Alenduff et al. . |
| 4,827,152 | 5/1989 | Farkas . |
| 5,373,198 | 12/1994 | Jiminez . |
| 5,646,458 | * 7/1997 | Bowyer et al. .................. 307/67 |
| 6,014,015 | * 1/2000 | Thorne et al. .................. 322/15 |
| 6,031,294 | * 3/2000 | Gels et al. ...................... 290/52 |

* cited by examiner

*Primary Examiner*—Josie Ballato
*Assistant Examiner*—Robert L. DeBeradinis
(74) *Attorney, Agent, or Firm*—Irell & Manella LLP

(57) ABSTRACT

A reciprocating engine generator set and a permanent magnet turbogenerator/motor integrated into a single power generation package. Control means are provided to: (a) select between a load control mode of operation, a load following mode of operation, or a peak shaving mode of operation for the permanent magnet turbogenerator/motor when utility grid power is available to the load; (b) to start the reciprocating engine electric generator when utility grid power is unavailable; and (c) to start the permanent magnet turbogenerator/motor with power from the reciprocating engine electric generator when utility grid power is unavailable.

11 Claims, 5 Drawing Sheets

INTEGRATED RECIPROCATING ENGINE GENERATOR SET AND TURBOGENERATOR SYSTEM AND METHOD

TECHNICAL FIELD

This invention relates generally to power generation systems, and more particularly to a reciprocating engine generator set and a turbogenerator integrated into one power system.

BACKGROUND OF THE INVENTION

Conventional reciprocating engine (or internal combustion) generator sets are commonly used for standby and emergency power. In the event of a power outage in a building or facility, these reciprocating engine generator sets can be started to provide power for the building or facility. The high maintenance requirements make reciprocating engine generator sets unsuitable, however, for continuous load applications, such as base loading, peak shaving, and load following. In addition, reciprocating engine generator sets cannot be used for sustained load applications in non-attainment zones since their high emission levels do not meet current regulatory requirements for continuous operation. The expense of downtime, however, can easily justify a relatively low cost reciprocating engine generator set for standby.

On the other hand, a turbogenerator has low emission levels and grid parallel operational features ideal for continuous, base load, load following, and peak shaving applications. However, for standby and emergency applications where the utility grid is not available, an external energy source (such as batteries, for example) is required for starting. In addition, since the turbogenerator can utilize a recuperator for improving overall cycle efficiency and the recuperator stores a significant amount of thermal energy, an external energy sink may be required to dissipate this energy when offloading the turbogenerator during standalone operation.

Unlike reciprocating engine generator sets that possess significant inertial mass for dissipating energy, the turbogenerator's low inertial mass of the rotating components (shaft, compressor, turbine, and permanent magnet rotor) requires an external heat sink for offloads. The low inertial mass properties of the turbogenerator also increase the energy storage requirements of the external energy source as a result of inrush currents for turbogenerator starts.

SUMMARY OF THE INVENTION

A reciprocating engine generator set and a turbogenerator can be integrated into a single power generation package improving the functionality of each individual system. The integrated reciprocating engine generator set and turbogenerator will improve the overall system efficiency, particularly at reduced or part load conditions. The turbogenerator can utilize the reciprocating engine generator set energy sink (increased inertial mass) and energy source (start batteries) capabilities and eliminate the need for a separate energy sink and energy source.

The size of the reciprocating engine generator set can be reduced by as much as 50% with the addition of turbogenerator power during standby operation. Unlike the reciprocating engine generator set where the engine operates as a single speed and a reduction gearbox produces the 50/60 Hz AC power, the turbogenerator controller can decouple turbogenerator speed from frequency output and the turbogenerator can run at maximum turbine temperature and efficiency at reduced loads.

BRIEF DESCRIPTION OF THE DRAWINGS

Figure 1:
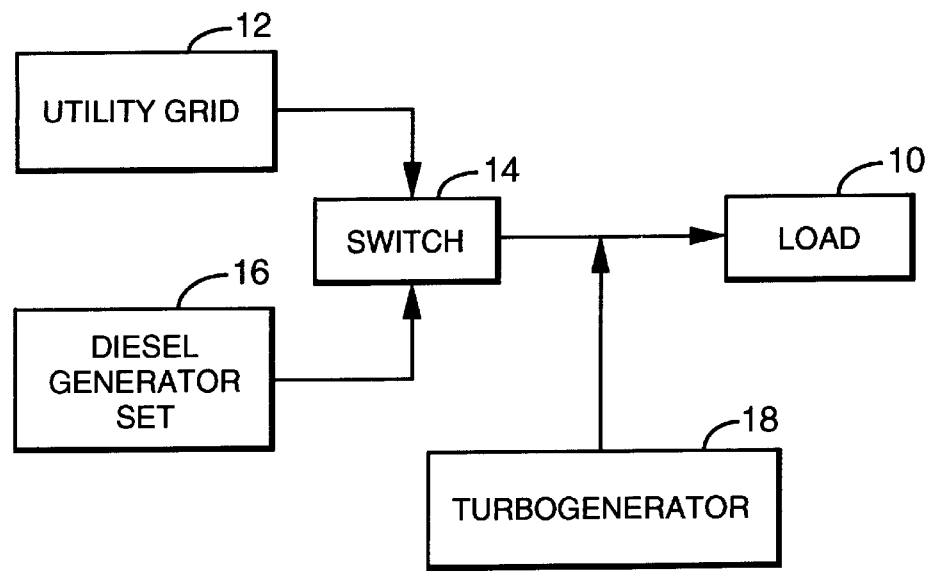
Figure 2:
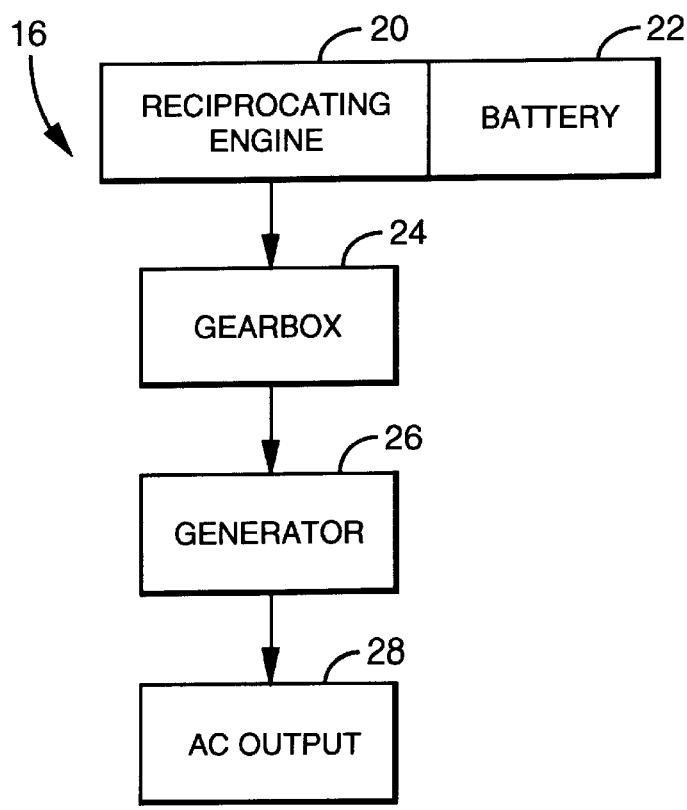
Figure 3:
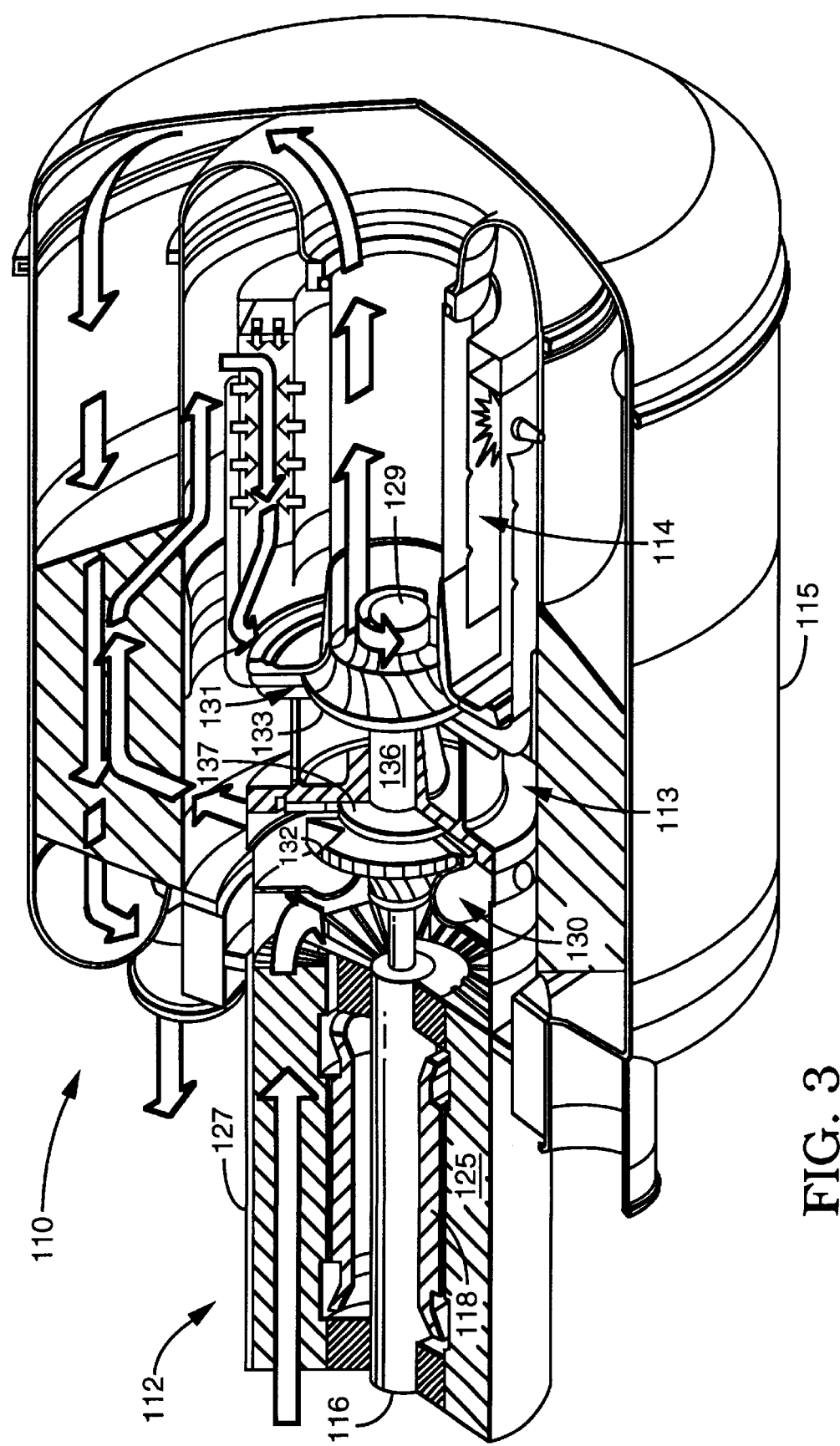
Figure 4:
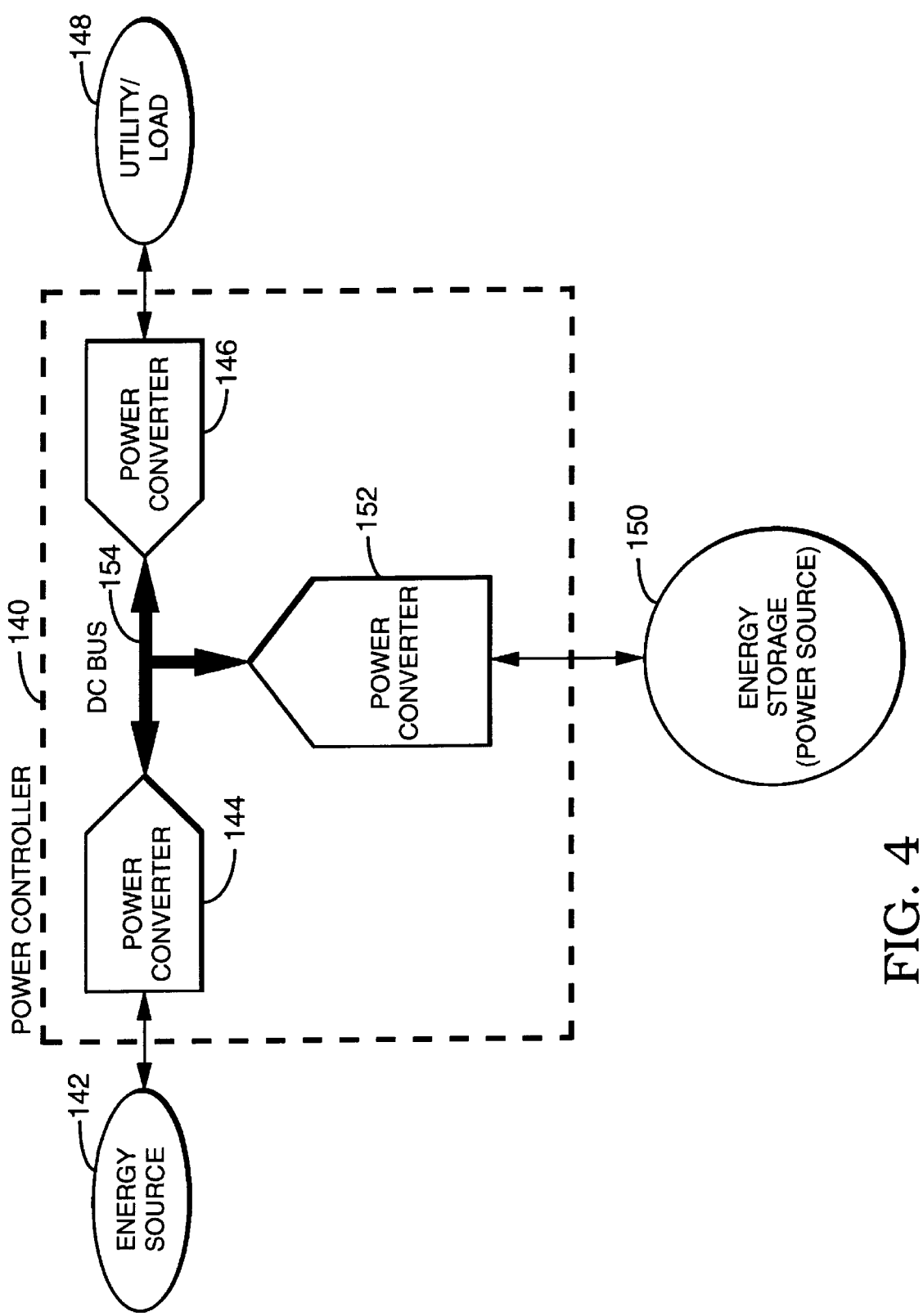
Figure 5:
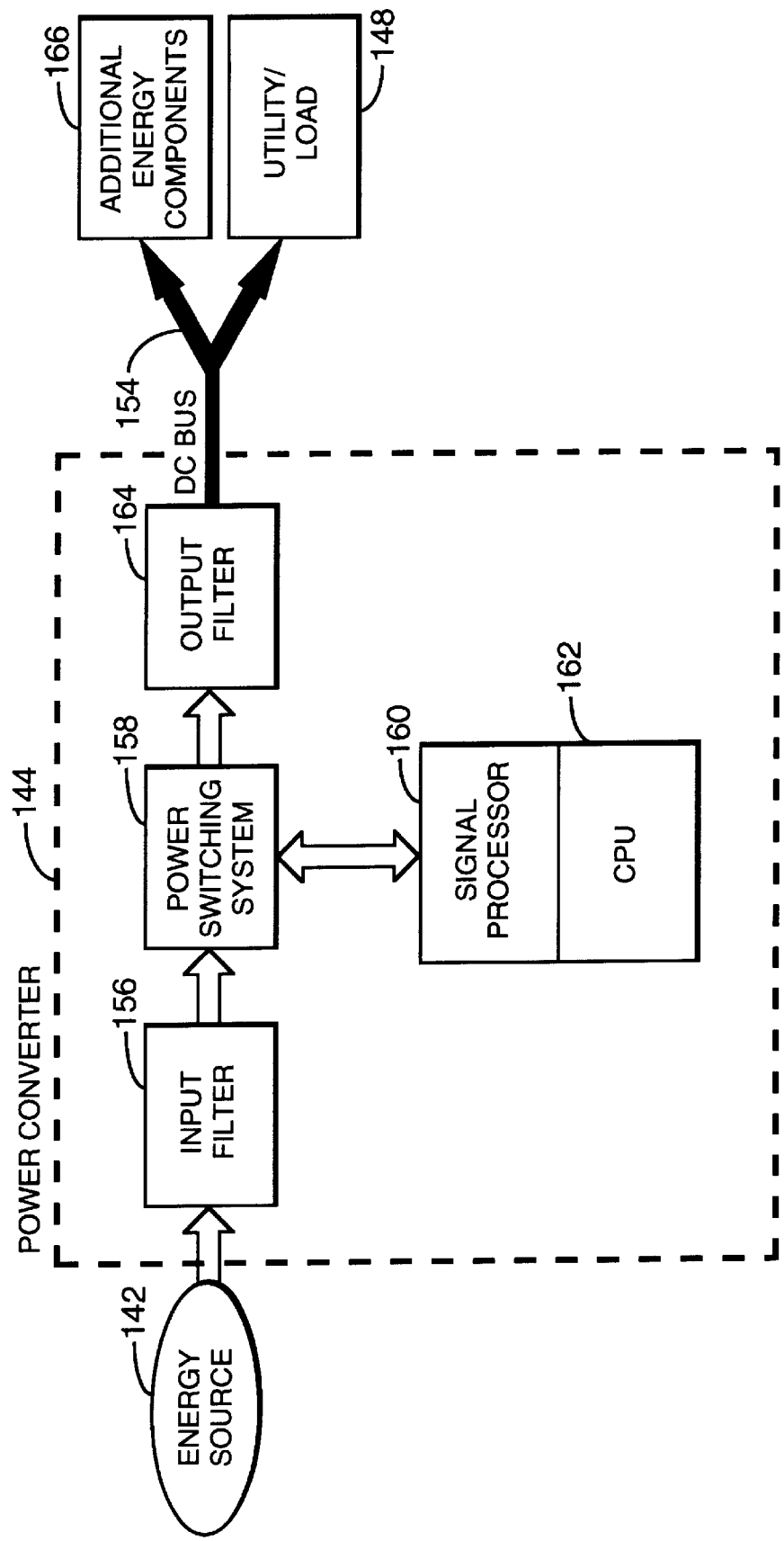
Figure 6:
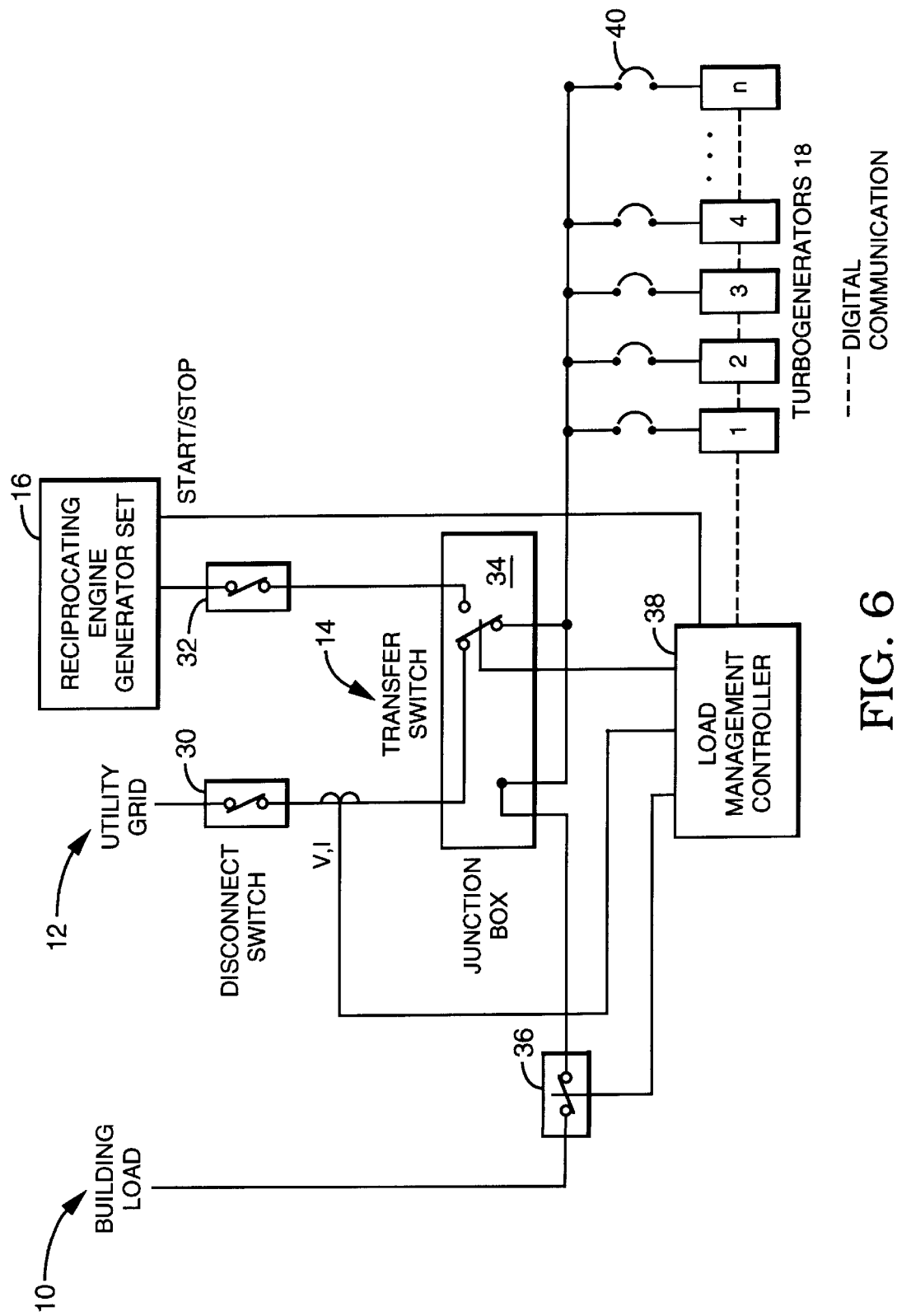

Having thus described the present invention in general terms, reference will now be made to the accompanying drawings in which:

FIG. 1 is a schematic diagram of the basic integrated reciprocating engine generator set and turbogenerator system of the present invention;

FIG. 2 is a schematic diagram of schematic diagram of a reciprocating engine generator set for use in the integrated reciprocating engine generator set and turbogenerator system of the present invention;

FIG. 3 is a perspective view, partially cut away, of a turbogenerator for use in the integrated reciprocating engine generator set and turbogenerator system of the present invention;

FIG. 4 is a detailed block diagram of a power controller for the turbogenerator of FIG. 3;

FIG. 5 is a detailed block diagram of the power converter in the power controller illustrated in FIG. 4;

FIG. 6 is a more detailed schematic block diagram of the integrated reciprocating engine generator set and turbogenerator system of FIG. 1.

DETAILED DESCRIPTION OF THE PREFERRED EMBODIMENTS

The basic integrated reciprocating engine generator set and turbogenerator system of the present invention is illustrated in FIG. 1. In normal operation, the load 10 is provided with electrical power from the utility grid 12 with switch 14 connecting the utility grid 12 directly to the load 10. In the event of a failure of the utility grid 12, the reciprocating engine generator set 16 can be started and the position of the switch 14 changed to connect the reciprocating engine generator set 16 directly to the load 10. Using energy available from the reciprocating engine generator set 16, the turbogenerator 18 is then started to provide additional power to the load 10.

The reciprocating engine generator set 16 and the turbogenerator 18 can be sized to provide various options available to supply the entire load. The reciprocating engine generator set 16, which can provide power in 10 seconds or less, should be sized to provide from 30% to 50% of the required standby load. The turbogenerator, which may take up to 2 minutes to provide power, would provide the remainder of the required standby load and can also provide peak shaving and load following options during normal operations.

The reciprocating engine generator set 16 is schematically illustrated in FIG. 2 and generally comprises a reciprocating engine 20 (including battery 22), gearbox 24, and generator 26 to produce an AC output 28. The reciprocating engine 20, which operates at a single speed, powers the generator 26 through reduction gearbox 24.

A permanent magnet turbogenerator 110 is illustrated in FIG. 3 as an example of a turbogenerator 18 for use with the power control system of the present invention. The permanent magnet turbogenerator 110 generally comprises a permanent magnet generator 112, a power head 113, a combustor 114 and a recuperator (or heat exchanger) 115.

The permanent magnet generator 112 includes a permanent magnet rotor or sleeve 116, having a permanent magnet disposed therein, rotatably supported within a permanent magnet motor stator 118 by a pair of spaced journal bearings. Radial stator cooling fins 125 are enclosed in an outer cylindrical sleeve 127 to form an annular air flow passage which cools the stator 118 and thereby preheats the air passing through on its way to the power head 113.

The power head 113 of the permanent magnet turbogenerator 110 includes compressor 130, turbine 131, and bearing rotor 136 through which the tie rod 129 passes. The compressor 130, having compressor impeller or wheel 132 which receives preheated air from the annular air flow passage in cylindrical sleeve 127 around the permanent magnet motor stator 118, is driven by the turbine 131 having turbine wheel 133 which receives heated exhaust gases from the combustor 114 supplied with air from recuperator 115. The compressor wheel 132 and turbine wheel 133 are rotatably supported by bearing shaft or rotor 136 having radially extending bearing rotor thrust disk 137.

The bearing rotor 136 is rotatably supported by a single journal bearing within the center bearing housing while the bearing rotor thrust disk 137 at the compressor end of the bearing rotor 136 is rotatably supported by a bilateral thrust bearing. The bearing rotor thrust disk 137 is adjacent to the thrust face of the compressor end of the center bearing housing while a bearing thrust plate is disposed on the opposite side of the bearing rotor thrust disk 137 relative to the center housing thrust face.

Intake air is drawn through the permanent magnet generator 112 by the compressor 130 which increases the pressure of the air and forces it into the recuperator 115. In the recuperator 115, exhaust heat from the turbine 131 is used to preheat the air before it enters the combustor 114 where the preheated air is mixed with fuel and burned. The combustion gases are then expanded in the turbine 131 which drives the compressor 130 and the permanent magnet rotor 116 of the permanent magnet generator 112 which is mounted on the same shaft as the turbine wheel 133. The expanded turbine exhaust gases are then passed through the recuperator 115 before being discharged from the turbogenerator 110.

The system has a steady-state turbine exhaust temperature limit, and the turbogenerator operates at this limit at most speed conditions to maximize system efficiency. This turbine exhaust temperature limit is decreased at low ambient temperatures to prevent engine surge.

Referring to FIG. 4, the power controller 140, which may be digital, provides a distributed generation power networking system in which bidirectional (i.e. reconfigurable) power converters (or inverters) are used with a common DC bus 154 for permitting compatibility between one or more energy components. Each power converter operates essentially as a customized bidirectional switching converter configured, under the control of power controller 140, to provide an interface for a specific energy component to DC bus 154. Power controller 140 controls the way in which each energy component, at any moment, with sink or source power, and the manner in which DC bus 154 is regulated. In this way, various energy components can be used to supply, store and/or use power in an efficient manner.

The energy components, as shown in FIG. 4, include an energy source 142 such as the turbogenerator 110, utility/load 148, and storage device 150, which in this case is the reciprocating engine generator set 16 or simply battery 22. A detailed block diagram of power converter 144 in the power controller 140 of FIG. 4 is illustrated in FIG. 5. The energy source 142 is connected to DC bus 154 via power converter 144. Energy source 142 may produce AC which is applied to power converter 144. DC bus 154 connects power converter 144 to utility/load 148 and additional energy components 166. Power converter 144 includes input filter 156, power switching system 158, output filter 164, signal processor 160 and main CPU 162.

In operation, energy source 142 applies AC to input filter 156 in power converter 144. The filtered AC is then applied to power switching system 158 which may conveniently be a series of insulated gate bipolar transistor (IGBT) switches operating under the control of signal processor 160 which is controlled by main CPU 162. The output of the power switching system 158 is applied to output filter 164 which then applies the filtered DC to DC bus 154.

Each power converter 144, 146, and 152 operates essentially as a customized, bi-directional switching converter under the control of main CPU 162, which uses signal processor 160 to perform its operations. Main CPU 162 provides both local control and sufficient intelligence to form a distributed processing system. Each power converter 144, 146, and 152 is tailored to provide an interface for a specific energy component to DC bus 154. Main CPU 162 controls the way in which each energy component 142, 148, and 150 sinks or sources power and DC bus 154 is regulated at any time. In particular, main CPU 162 reconfigures the power converters 144, 146, and 152 into different configurations for different modes of operation. In this way, various energy components 142, 148, and 150 can be used to supply, store and/or use power in an efficient manner.

In the case of a turbogenerator 110 as the energy source 142, a conventional system regulates turbine speed to control the output or bus voltage. In the power controller 140, the bi-directional controller functions independently of turbine speed to regulate the bus voltage.

FIG. 4 generally illustrates the system topography with the DC bus 154 at the center of a star pattern network. In general, energy source 142 provides power to DC bus via power converter 144 during normal power generation mode. Similarly, during power generation, power converter 146 converts the power on DC bus 154 to the form required by utility/load 148. During utility start up, power converters 144 and 146 are controlled by the main processor to operate in different manners. For example, if energy is needed to start the turbogenerator 110, this energy may come from load/utility 148 (utility start) or from energy source 150 (non-utility start). During a utility start up, power converter 146 is required to apply power from load 148 to DC bus for conversion by power converter 144 into the power required by the turbogenerator 110 to start up. During utility start, the turbogenerator 110 is controlled in a local feedback loop to maintain the turbine revolutions per minute (RPM). Energy storage 150 is disconnected from DC bus while load/utility grid regulates $V_{DC}$ on DC bus 154.

Similarly, in a non-utility start, the power applied to DC bus 154 from which turbogenerator 110 may be started, may be provided by energy storage 150. Energy storage 150 has its own power conversion circuit in power converter 152, which limits the surge current into the DC bus 154 capacitors, and allows enough power to flow to DC bus 154 to start turbogenerator 110. In particular, power converter 144 isolates the DC bus 154 so that power converter 144 can provide the required starting power from DC bus 154 to turbogenerator 110.

A more detailed description of the power controller can be found in U.S. patent application Ser. No. 09/207,817, filed Dec. 8, 1998 by Mark G. Gilbreth et al, entitled "Power Controller", assigned to the same assignee as this application and hereby incorporated by reference pending.

A more detailed schematic diagram of the integrated reciprocating engine generator set and turbogenerator system of the present invention is illustrated in FIG. 6. Both the reciprocating engine generator set 16 and the utility grid 12 are connected to a transfer switch 14; the reciprocating engine generator set 16 through disconnect switch 32 and the utility grid 12 through disconnect switch 30. The transfer switch 14 is positioned in a junction box 34. As illustrated in FIG. 6, the transfer switch 14 connects the utility grid 12 to the building load 10 through disconnect switch 36 and the reciprocating engine generator set 16 is not connected.

A number of turbogenerators 18 can also be connected to the building load 10 through junction box 34 and disconnect switch 36. Each of the individual turbogenerators 18 is connected through a contactor 40. The load management controller 38 receives voltage and current signals from the utility grid 12, provides a start/stop signal to the reciprocating engine generator set 16, controls the position of transfer switch 34 and disconnect switch 36 to the load 10, and digitally controls the turbogenerators 18.

In the simplest application where both the reciprocating engine generator set 16 and the turbogenerators 18 is used for standby only, neither the reciprocating engine generator set 16 nor the turbogenerators 18 would be running when utility grid power is available. Since the turbogenerators 18 are, however, available, they can readily be utilized to supply power to the utility grid 12 or to the building load 10. Depending upon the mode of operation selected, the turbogenerators 18 can be utilized for load dispatch, peak shaving and/or load following as described in a U.S. patent application Ser. No. 09/360,043, filed Jul. 23, 1999 pending entitled "Turbogenerator Power Control System and Method" by Joel B. Wacknov, Mark G. Gilbreth, and Edward C. Edelman, assigned to the same Assignee as this application, and incorporated herein by reference.

In the event of a power outage from the utility grid 12, the load management controller 38 detects the loss of voltage and immediately starts the reciprocating engine generator set 16. If the turbogenerators 18 are not running, the load management controller 38 will start the number of turbogenerators 18 needed to meet the standby load as soon as the reciprocating engine generator set 16 is ready-to-load and provides such a signal to the load management controller 38. The turbogenerator power controller 140 synchronizes the inverter signal output to the reciprocating engine generator set output and the load management controller 38 closes the building load contactor 36 as soon as the turbogenerators 18 provide a ready-to-load signal to the load management controller 38.

When the load management controller 38 detects the utility grid's return, it synchronizes the reciprocating engine generator set 16 and turbogenerator 18 outputs, switches the power to the utility providing an uninterrupted power transfer and automatically shuts down the reciprocating engine generator set 16 and the turbogenerators 18.

If, however, one or more of the turbogenerators 18 are running when the power outage is detected by the load management controller 38, the running turbogenerators 18 are placed in a idle state (running with no load output) until the reciprocating engine generator set 16 is ready-to-load. At that time, any additional turbogenerators 18 needed to meet the load are started and sequenced to the load state to meet the building demand. The building contactor 36 is closed when all of the turbogenerators 18 have been synchronized to the reciprocating engine generator set 16 output.

When the load management controller 38 detects that the utility grid 12 returns, it synchronizes the reciprocating engine generator set 16 and turbogenerator 18 outputs, switches the power to the utility providing an uninterrupted power transfer and automatically shuts down the reciprocating engine generator set 16 and the turbogenerators 18 that were not running at the time of the power outage. Those turbogenerators 18 that were running at the time of the power outage return to the previous mode of operation whether it be load discharge, peak shaving, or load following.

The present invention not only provides peak shaving and load following but also standby power. Why the reciprocating engine generator set 16 can provide standby power by itself, it is not capable of peak shaving or load following. The turbogenerators 18, while fully capable of peak shaving and load following because of their low emission, low noise, low vibrations, etc., requires a secondary energy source such as a battery for standby capability. The integrated systems allow cheaper and simpler turbogenerators 18 to be utilized since the reciprocating engine generator set 16 provides load transient, inrush current and start power for the turbogenerators 18. Since the turbogenerators 18 are modular, standby power, peak shaving power and load following can easily be increased as building load demands increase.

By way of example, instead of a 150 kW diesel generator set provided solely for standby, the present invention could use a 60 kW diesel generator plus three 30 kW turbogenerators. In both instances there will be 150 kW of standby power. With the turbogenerators, however, there is also 90 kW of peak shaving and/or load following capability in the system. Also, there would be less emissions, noise, and vibrations in the integrated system.

The integrated system will improve the overall system efficiency, particularly at reduced or part load conditions. Since the turbogenerator inverter decouples engine speed from frequency output, the turbogenerator can run at maximum turbine temperature and efficiency at reduced load; something the reciprocating engine is unable to do.

While specific embodiments of the invention have been illustrated and described, it is to be understood that these are provided by way of example only and that the invention is not to be construed as being limited thereto but only by the proper scope of the following claims.

What we claim is:

1. A method of supplying electrical power to a load, comprising the steps of:
   supplying the load with electric power from the electric utility grid when available;
   electrically connecting at least one permanent magnet turbogenerator/motor to the load to supply electric power to the load, the at least one permanent magnet turbogenerator/motor having a controller to select between a load control mode of operation, a load following mode of operation, or a peak shaving mode of operation;
   electrically connecting a reciprocating engine electric generator to the load in parallel with the at least one permanent magnet turbogenerator/motor, the reciprocating engine electric generator to supply less than all of the standby electric power to the load and electric power to start the at least one permanent magnet turbogenerator/motor when electric utility grid power is unavailable, with the at least one permanent magnet turbogenerator/motor to supply the remainder of the standby electric power to the load.

2. A method of supplying electrical power to a load, comprising:

supplying the load with electric power from the electric utility grid when available;

electrically connecting at least one permanent magnet turbogenerator/motor to the load to supply electric power to the load, the at least one permanent magnet turbogenerator/motor having a controller to select between a load control mode of operation, a load following mode of operation, or a peak shaving mode of operation;

electrically connecting a reciprocating engine electric generator to the load in parallel with the at least one permanent magnet turbogenerator/motor, the reciprocating engine electric generator to supply up to fifty percent of the standby electric power to the load and electric power to start the at least one permanent magnet turbogenerator/motor when electric utility grid power is unavailable, with the at least one permanent magnet turbogenerator/motor to supply the remainder of the standby electric power to the load.

3. A method of supplying electrical power to a load, comprising:

supplying the load with electric power from the electric utility grid when available;

electrically connecting a plurality of permanent magnet turbogenerator/motors to the load to supply electric power to the load, each of said plurality of permanent magnet turbogenerator/motors having a controller to select between a load control mode of operation, a load following mode of operation, or a peak shaving mode of operation;

electrically connecting a reciprocating engine electric generator to the load in parallel with the plurality of permanent magnet turbogenerator/motors, the reciprocating engine electric generator to supply less than all of the standby electric power to the load and electric power to start the plurality of permanent magnet turbogenerator/motors when electric utility grid power is unavailable, with the plurality of permanent magnet turbogenerator/motors to supply the remainder of the standby electric power to the load.

4. An electric power system for a load supplied with power from the electric utility grid, comprising:

at least one permanent magnet turbogenerator/motor operably connected to the load to supply electric power to the load;

a reciprocating engine electric generator operably connected to the load in parallel with said at least one permanent magnet turbogenerator/motor to, when electric utility grid power is unavailable, supply a steady level of power, less than all, of the standby electric power to the load, and to supply electric power to start said at least one permanent magnet turbogenerator/motor, with said at least one permanent magnet turbogenerator/motor to supply the remainder of the standby electric power to the load; and control means operable associated with said at least one permanent magnet turbogenerator/motor, said reciprocating engine electric generator, and the load to: (a) select between a load control mode of operation, a load following mode of operation, or a peak shaving mode of operation for said at least one permanent magnet turbogenerator/motor when utility grid power is available to the load; (b) to start said reciprocating engine electric generator when utility grid power is unavailable; and (c) to start said at least one permanent magnet turbogenerator/motor with power from said reciprocating engine electric generator when utility grid power is unavailable.

5. An electric power system for a load supplied with power from the electric utility grid, comprising:

at least one permanent magnet turbogenerator/motor operably connected to the load to supply electric power to the load;

a reciprocating engine electric generator operably connected to the load in parallel with said at least one permanent magnet turbogenerator/motor to, when electric utility grid power is unavailable, supply a steady level of power, up to fifty percent of the standby electric power to the load, and to supply electric power to start said at least one permanent magnet turbogenerator/motor, with said at least one permanent magnet turbogenerator/motor to supply the remainder of the standby electric power to the load; and control means operable associated with said at least one permanent magnet turbogenerator/motor, said reciprocating engine electric generator, and the load to: (a) select between a load control mode of operation, a load following mode of operation, or a peak shaving mode of operation for said at least one permanent magnet turbogenerator/motor when utility grid power is available to the load; (b) to start said reciprocating engine electric generator when utility grid power is unavailable; and (c) to start said at least one permanent magnet turbogenerator/motor with power from said reciprocating engine electric generator when utility grid power is unavailable.

6. An electric power system for a load supplied with power from the electric utility grid, comprising:

a plurality of permanent magnet turbogenerator/motors operably connected to the load to supply electric power to the load;

a reciprocating engine electric generator operably connected to the load in parallel with said plurality of permanent magnet turbogenerator/motors to, when electric utility grid power is unavailable, supply a steady level of power, less than all, of the standby electric power to the load, and to supply electric power to start said plurality of permanent magnet turbogenerator/motors, with said plurality of permanent magnet turbogenerator/motors to supply the remainder of the standby electric power to the load; and control means operable associated with said plurality of permanent magnet turbogenerator/motors, said reciprocating engine electric generator, and the load to: (a) select between a load control mode of operation, a load following mode of operation, or a peak shaving mode of operation for said plurality of permanent magnet turbogenerator/motors when utility grid power is available to the load; (b) to start said reciprocating engine electric generator when utility grid power is unavailable; and (c) to start said plurality of permanent magnet turbogenerator/motors with power from said reciprocating engine electric generator when utility grid power is unavailable.

7. An electric power system for a load supplied with power from the electric utility grid, comprising:

a plurality of permanent magnet turbogenerator/motors operably connected to the load to supply electric power to the load;

a reciprocating engine electric generator operably connected to the load in parallel with said plurality of permanent magnet turbogenerator/motors to, when electric utility grid power is unavailable, supply a steady level of power, less than all, of the standby electric power to the load, and to supply electric power to start said plurality of permanent magnet turbogenerator/motors, with said plurality of permanent magnet turbogenerator/motors to supply the remainder of the standby electric power to the load;

a load management controller operable associated with said plurality of permanent magnet turbogenerator/motors, said reciprocating engine electric generator, the electric utility grid, and the load to: (a) select between a load control mode of operation, a load following mode of operation, or a peak shaving mode of operation for each of said plurality of permanent magnet turbogenerator/motors when utility grid power is available to the load; (b) to start said reciprocating engine electric generator when utility grid power is unavailable; and (c) to start said plurality of permanent magnet turbogenerator/motor with power from said reciprocating engine electric generator when utility grid power is unavailable; and a transfer switch operably associated with said load management controller, said plurality of permanent magnet turbogenerator/motors, said reciprocating engine electric generator, the electric utility grid, and the load to transfer power as directed by said load management controller.

8. An electric power system for a load supplied with power from the electric utility grid, comprising:

a plurality of permanent magnet turbogenerator/motors operably connected to the load to supply electric power to the load;

a reciprocating engine electric generator operably connected to the load in parallel with said plurality of permanent magnet turbogenerator/motors to, when electric utility grid power is unavailable, supply a steady level of power, up to fifty percent of the standby electric power to the load, and to supply electric power to start said plurality of permanent magnet turbogenerator/motors, with said plurality of permanent magnet turbogenerator/motors to supply the remainder of the standby electric power to the load;

a load management controller operable associated with said plurality of permanent magnet turbogenerator/motors, said reciprocating engine electric generator, the electric utility grid, and the load to: (a) select between a load control mode of operation, a load following mode of operation, or a peak shaving mode of operation for each of said plurality of permanent magnet turbogenerator/motors when utility grid power is available to the load; (b) to start said reciprocating engine electric generator when utility grid power is unavailable; and (c) to start said plurality of permanent magnet turbogenerator/motor with power from said reciprocating engine electric generator when utility grid power is unavailable; and a transfer switch operably associated with said load management controller, said plurality of permanent magnet turbogenerator/motors, said reciprocating engine electric generator, the electric utility grid, and the load to transfer power as directed by said load management controller.

9. The electric power system for a load supplied with power from the electric utility grid of claim 8 and in addition, a first disconnect switch disposed between said transfer switch and said load, a second disconnect switch disposed between said utility grid and said transfer switch, and a third disconnect switch disposed between said reciprocating engine electric generator and said transfer switch.

10. A method of supplying electrical power to a load, comprising:

supplying the load with electric power from the electric utility grid when available;

electrically connecting a plurality of permanent magnet turbogenerator/motors to the load to supply electric power to the load, each of said plurality of permanent magnet turbogenerator/motors having a controller to select between a load control mode of operation, a load following mode of operation, or a peak shaving mode of operation;

electrically connecting a reciprocating engine electric generator to the load in parallel with the plurality of permanent magnet turbogenerator/motors, the reciprocating engine electric generator to supply up to fifty percent of the standby electric power to the load and electric power to start the plurality of permanent magnet turbogenerator/motors when electric utility grid power is unavailable, with the plurality of permanent magnet turbogenerator/motors to supply the remainder of the standby electric power to the load.

11. An electric power system for a load supplied with power from the electric utility grid, comprising:

a plurality of permanent magnet turbogenerator/motors operably connected to the load to supply electric power to the load;

a reciprocating engine electric generator operably connected to the load in parallel with said plurality of permanent magnet turbogenerator/motors to, when electric utility grid power is unavailable, supply a steady level of power, up to fifty percent, of the standby electric power to the load, and to supply electric power to start said plurality of permanent magnet turbogenerator/motors, with said plurality of permanent magnet turbogenerator/motors to supply the remainder of the standby electric power to the load; and control means operable associated with said plurality of permanent magnet turbogenerator/motors, said reciprocating engine electric generator, and the load to: (a) select between a load control mode of operation, a load following mode of operation, or a peak shaving mode of operation for said plurality of permanent magnet turbogenerator/motors when utility grid power is available to the load; (b) to start said reciprocating engine electric generator when utility grid power is unavailable; and (c) to start said plurality of permanent magnet turbogenerator/motors with power from said reciprocating engine electric generator when utility grid power is unavailable.

* * * * *

UNITED STATES PATENT AND TRADEMARK OFFICE
CERTIFICATE OF CORRECTION

PATENT NO. : 6,194,794 B1  Page 1 of 1
DATED : February 27, 2001
INVENTOR(S) : Steven W. Lampe et al.

It is certified that error appears in the above-identified patent and that said Letters Patent is hereby corrected as shown below:

Column 2,
Line 12, delete "schematic diagram of".

Column 9,
Lines 9 and 45, delete "operable" and substitute -- operably --.

Column 10,
Line 48, delete "operable" and substitute -- operably --.

Signed and Sealed this

Twenty-sixth Day of February, 2002

*Attest:*

*Attesting Officer*

JAMES E. ROGAN
*Director of the United States Patent and Trademark Office*